United States Patent [19]

Komeya et al.

[11] Patent Number: 4,852,932
[45] Date of Patent: Aug. 1, 1989

[54] CONTAINER DEVICE USED IN A VEHICLE

[75] Inventors: Seiji Komeya; Mitsuhiro Hara, both of Toyoto, Japan

[73] Assignee: Kajima Press Industry Co., Ltd., Toyota, Japan

[21] Appl. No.: 119,858

[22] Filed: Nov. 12, 1987

[30] Foreign Application Priority Data

Nov. 14, 1986 [JP] Japan .............. 61-174025[U]
Nov. 14, 1986 [JP] Japan .............. 61-174026[U]
Nov. 14, 1986 [JP] Japan .............. 61-174027[U]
Nov. 17, 1986 [JP] Japan .............. 61-175381[U]

[51] Int. Cl.$^4$ .................................. B60N 3/12
[52] U.S. Cl. .......................... 296/37.9; 312/330.1; 224/281
[58] Field of Search ............ 296/37.9, 37.8; 131/231; 312/330 R X; 224/281 X

[56] References Cited

U.S. PATENT DOCUMENTS

| 4,460,881 | 4/1987 | Komeya et al. | 296/37.9 |
| 4,466,449 | 8/1984 | Summers | 296/37.9 |
| 4,494,806 | 1/1985 | Williams et al. | 312/330 R |

FOREIGN PATENT DOCUMENTS 59-81397 6/1984 Japan .
209926 11/1984 Japan .

Primary Examiner—Robert R. Song
Attorney, Agent, or Firm—Birch, Stewart, Kolasch & Birch

[57] ABSTRACT

A container device used in a vehicle includes a retainer, a box, a power source for driving the box and a driving force transmission. The power source is provided on a back portion of the box itself or a back portion of the retainer as viewed along the direction of movement of the box. In the device the portion which has been a dead space in a conventional device is effectively utilized as a location of the power source. The device is constituted small-sized as a whole and the outer shape of the entire device is simplified.

10 Claims, 7 Drawing Sheets

CONTAINER DEVICE USED IN A VEHICLE

BACKGROUND OF THE INVENTION

1. Field of the Invention

The present invention relates to a container device used in a vehicle, and more specifically relates to a container device having a power source for imparting motion to a container.

2. Description of the Prior Art

There are various well-known container devices which are disposed in a retainer fixed to an instrument panel or the like of a vehicle. The container is slidably held by the retainer for example, the container can be a smoking ashtray box, a box for holding small objects or coins, or a slidable control box for the operation of an air conditioner, etc. Container devices equipped with a power source, for example, motors for driving the box in a sliding direction of the box are also known. For instance, unexamined Japanese Utility Model Publication SHO No. 59-81397. Such a container device, an ashtray device in the above publication, is very convenient for use because the box can be automatically moved, sliding the box in and out, by the driving force of the power source.

In a conventional container device used in a vehicle, which has a power source for driving the box, the power source is provided at a position on a retainer side, a fixed member side, or a position projecting outwardly, in a lateral or lower direction, from the box. Driving force transmission means is provided between the power source and the box.

However, in a conventional container device as described above, the power source is located so as to project in a lateral or lower direction from the device. Thus, the outer size of the entire device becomes large and the outer shape of the device tends to become a shape difficult to assemble into a panel, etc. If the size of the entire device is restricted to a size smaller than a certain size in order to prevent the device from becoming too big, there occurs a problem since the capacity of the box becomes too small. Moreover, since the power source projects from the device, there often occurs a problem in that the space around the power source can not be efficiently utilized and the space becomes a dead space.

On the other hand, an ashtray device used in a vehicle is known wherein an ash box and a cigar lighter are positioned in the same retainer and the ash box and the cigar lighter can be simultaneously extended. FIG. 12 shows an example of such an ashtray device. In this device, outer case 101 is slidably held by retainer 102. Inner case 103 substantially constituting an ash box and cigar lighter 104 are attached in the outer case. Thus the inner case and the cigar lighter simultaneously appear when the outer case is drawn from the retainer.

Such an ashtray device is very convenient not only for use but also for assembly of the device into a vehicle or for parts control because the device can be treated as one part already assembled. Moreover, since the cigar lighter 104 is covered by a front plate 105 of the outer case 101 when the outer case is put in the retainer 102, the design of an instrument panel or the like of a vehicle can be simplified.

However, in the above type ashtray device, since the size of the space required for the location of the cigar lighter 104 in the direction 106 of sliding of the outer case 101 normally may be smaller than the size of an ash box in the same direction, the space 107 in back of the cigar lighter tends to become a dead space and the space can not be effectively utilized.

SUMMARY OF THE INVENTION

An object of the present invention is to provide a container device used in a vehicle, which has power source means for driving box means and wherein the size of the entire device can be reduced to a small size while the capacity of the box means can be maintained at a required value.

Another object of the present invention is to provide an efficient structure for a container device used in a vehicle, which does not cause a dead space in or around the device.

A further object of the present invention is to provide a convenient and efficient ashtray device used in a vehicle, which is constructed as a combination of an ashtray device having a power source means for driving a box and an ashtray device having an ash box and a cigar lighter which are simultaneously moved, and wherein the size of the entire device can be reduced to a small size while the capacity of the ash box can be maintained at a large value.

To accomplish the above objects, a container device used in a vehicle according to the present invention includes a retainer and a box slidably held by the retainer. A power source is capable of driving the box means at least in one of the directions of sliding of the box from the retainer. The power source means is located on a back portion of the box itself and a back portion of the retainer as viewed along the direction of sliding of the box. A driving force transmission means is provided for transmitting the driving force of the power source means to the box. For example, a power source means such as a motor, a diaphragm actuator or a spiral spring built-in type actuator may be used. The power source means generates driving force in one of the directions of sliding the box means in or out. For instance, in the withdrawal direction or in both directions.

In case the container device is an ashtray device, for example, the box comprises means which can slide and includes an ash box and a cigar lighter. The power source means is provided on a back portion adjacent to the cigar lighter as viewed along the direction of sliding in of the box.

In the above container device, the portion which has been a dead space in the conventional device, that is, the back portion of the box itself or the back portion of the retainer is effectively used as a portion for the location of the power source means. Since the location of the power source means is in a back portion of the box or the retainer as viewed along the direction of sliding in of the box, outward projection of the power source means from the device can be adequately prevented, thereby decreasing the size of the device as a whole. Also, since there is no projection of the power source means, the outer shape of the entire device can be easily formed as a simple one that is convenient for assembly to a panel etc. Furthermore, since the dead space around a power source means due to the projection of the power source, which has often occurred in a conventional device, is no longer required the space (for example, panel space) required for the disposition of the entire device becomes small.

In the ash box-cigar lighter type ashtray device wherein both the box and the lighter move simultaneously, since the location of the power source means is in back of the position of the cigar lighter, the addition of the power source means does not crowd the space for the location of the ash box in any substantial manner. Therefore, the capacity of the ash box can be maintained at a required large value. In such an ashtray device having the above arrangement of the ash box, the cigar lighter and the power source means, dead space is substantially eliminated over the entire device. Accordingly, although the ashtray device is a combination of the aforementioned devices of two types, an ash box-cigar lighter simultaneously sliding type ashtray device and an ashtray device having power source means, the size of the whole of the device can be adequately reduced to a small size and a sufficient capacity of ash box can be ensured within the size.

BRIEF DESCRIPTION OF THE DRAWINGS

The above and other objects, features and advantages of the present invention will be become apparent and more readily appreciated from the following detailed description of the preferred exemplary embodiments of the invention, taken in conjunction with the accompanying drawings, in which.

DETAILED DESCRIPTION OF THE PREFERRED EMBODIMENTS

Figure 1:
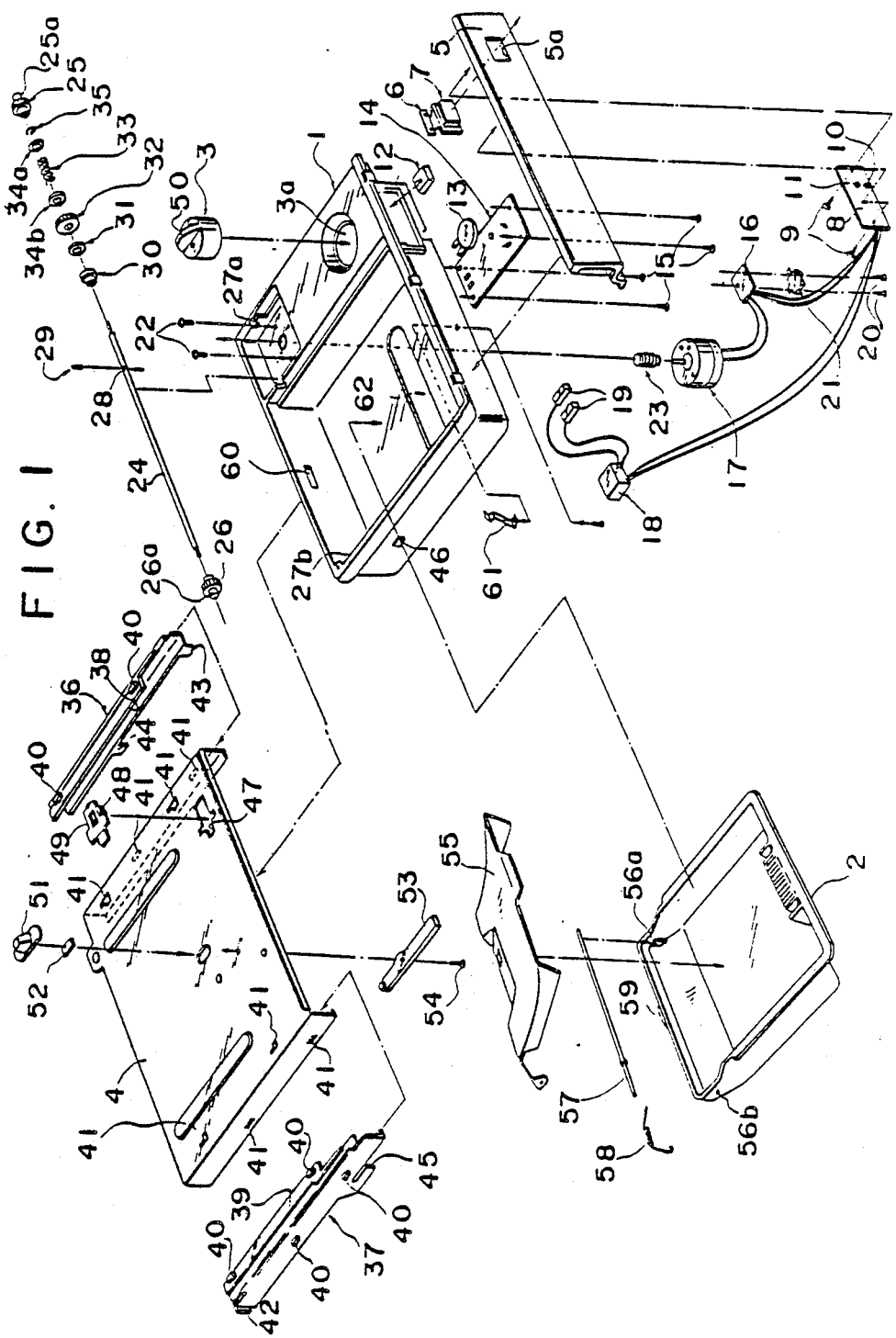
FIG. 1 is an exploded perspective view of a container device according to a first embodiment of the present invention.

Some preferred embodiments of the present invention will be described hereunder referring to the attached drawings.

FIGS. 1-5 show an ashtray device as a container device used in a vehicle according to a first embodiment of the present invention. An outer case 1 is box means which is slidably held by a retainer 4. In the outer case 1 an inner case 2 is detachably attached. The inner case 2 substantially constitutes an ash box. A cigar lighter 3 is inserted into a hole 3a formed on one side portion of the outer case 1. The cigar lighter 3 can be pulled up from the hole 3a when it is used. When the outer case 1 is drawn from the retainer 4 and is put into the retainer 4, the inner case 2 and cigar lighter 3 are also simultaneously slid in and out.

To the front portion of outer case 1, a door plate 5 is fixed. A supporting member 6 is attached to the door plate 5 and a push button 7 consisting of a lens is fixed to the supporting member so that the push button can project from the door plate through a hole 5a formed on the door plate. A printed board 8 is disposed behind the supporting member 6 and the printed board is attached on the back surface side of the door plate 5 via screws 9. On the printed board 8, a switch 10 for starting a motor described later as a power source means is provided. The supporting member 6 has an adequate elasticity so that the push button 7 can operate the switch 10 when it is pushed. Therefore, the starting of a motor can be controlled by the operation of the push button 7. The push button, the supporting member 6 and the switch 10 as a whole constitute switch means for control of the operation of power source means.

Figure 5:
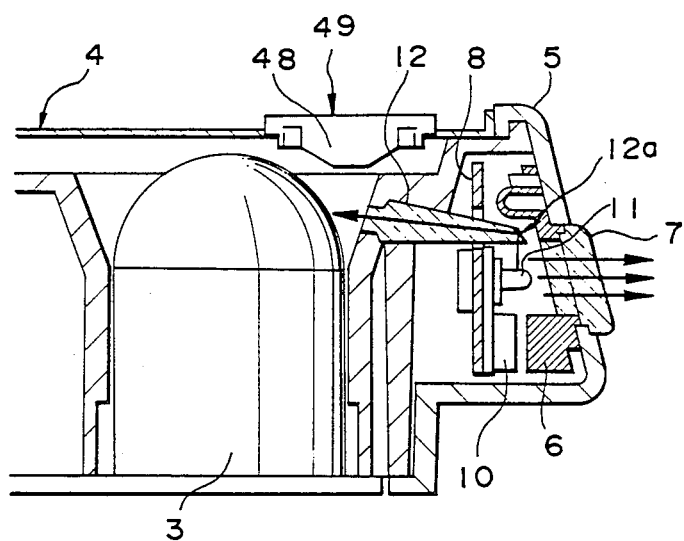
FIG. 5 is an enlarged sectional view of the device shown in FIG. 3.

On the printed board 8, a lamp 11 is provided as lighting means which can light the push button 7 from the inside as shown in FIG. 5. In this embodiment, a lens 12 is disposed as a light guide member between the lamp 11 and the cigar lighter 3. The light from the lamp 11 also can be viewed to the side of the cigar lighter 3 via a reflection surface 12a formed on the lens 12 and through the lens 12 itself. Accordingly, the lamp 11 can light the cigar lighter 3 or the circumference of the cigar lighter from the inside of the outer case 1 as well as the push button 7.

As shown in FIG. 1, an electrode member 13 for the cigar lighter 3 is attached on the bottom portion of the outer case 1 by an attaching plate 14 fixed on the bottom surface of the outer case via screws 15. The switch 10 is connected to a terminal box 18 which is connected to an appropriate power source (not shown), and the terminal box is connected to the electrode member 13 via connectors 19. The switch 10 is also connected to a motor 17 constituting a power source means for driving the outer case 1 through a printed board 16. The motor 17 consists of a reversible motor. The printed board 16 is fixed in the outer case 1 by screws 20. On the printed board 16, is provided a limit switch 21 which can control the on-off action of the electrical connection to the motor 17.

The motor 17 as power source means is disposed on a portion in back of the location of the cigar lighter 3 in the outer case 1. The motor 17 is attached from under and fixed by screws 22. The shaft of the motor 17 projects upward from the upper surface of the outer case 1. A worm gear 23 is fixed on the shaft.

The driving force transmission mechanism transmitting the driving force of the motor 17 from the motor to the outer case 1 is constructed as follows.

A drive shaft 24 driven by the motor 17 is rotatably supported on the outer case 1. Both end portions of the drive shaft 24 are formed as a square bar, spur gears 25 and 26 are attached to the both end portions of the drive shaft, respectively, and the drive shaft and the spur gears 25 and 26 are integrally rotated. The drive shaft 24 and the spur gears 25 and 26 are rotatably supported on the outer case 1 by rotatable engagement shaft portions 25a and 26a of the spur gears with bearing portions 27a and 27b of the outer case. On the drive shaft 24, a driven plate 30, a friction plate 31, a helical gear 32, a washer 34b, a spring 33, a washer 34a and an E ring 35 are mounted in this order. The driven plate 30 is fixed to the drive shaft 24 by a pin 29 inserted in a hole 28, and the driven plate and the drive shaft rotate integrally. The friction plate 31 faces to and contacts with the driven plate 30. The helical gear 32 is rotatably supported on the drive shaft 24 and the friction plate 31 is fixed to a side surface of the helical gear. This helical gear 32 engages with the worm gear 23 fixed to the motor shaft. When the torque transmitted from the helical gear 32 is higher than a certain level, there occurs a slip, that is, relative rotation between the friction plate 31 and the driven plate 30, and when the transmitted torque is lower than the level, the friction plate and the driven plate are rotated integrally by the friction therebetween. Thus, the above elements constitute a torque limiter mechanism 100. The slipping torque in this torque limiter mechanism is set by the spring 33 which is disposed between the washers 34a and 34b at a compressed condition, and the compressed condition of the spring is fixed by the E ring 35.

Guide rails 36 and 37 which slidably support and guide the outer case 1 in the directions of sliding in and out of the outer case are provided on inner surfaces of both side walls of the retainer 4. The guide rails 36 and 37 have racks 38 and 39 formed on their inner upper surfaces. The racks 38 and 39 engage with the spur gears 25 and 26 respectively. A plurality of hooks 40 are formed on each of the guide rails 36 and 37, and each hook is engaged with a corresponding hole 41 opened on the wall of the retainer 4. Each of the guide rails 36 and 37 is fixed to the retainer 4 by the engagement between the hooks 40 and the holes 41 and the engagement between a stopper 42 and the rear edge of the retainer.

On the lower portion of the guide rail 36, strikers 43 and 44 are formed so as to project downward. The striker 43 strikes the limit switch 21 when the limit switch is drawn outwardly together with the outer case 1, and by that action the limit switch can send a drawing end position signal. The striker 44 strikes the limit switch 21 when the limit switch is put in together with the outer case 1, and by that action the limit switch can send an end position signal indicating complete insertion. On the lower portion of the guide rail 37, a stopper 45 is formed. The stopper 45 engages with a stopper 46 when the outer case 1 comes out to the complete withdrawing end position, thereby stopping further withdrawing motion of the outer case.

On the upper wall of the retainer 4, a hole 47 is opened, and at that portion a cigar lighter pushing member 49 which has a convex portion 48 at the lower position is provided. The convex portion 48 of the cigar lighter pushing member 49 can engage with a knob 50 formed on the top of the cigar lighter 3 when the cigar lighter is drawn outwardly together with the outer case 1, and the convex portion pushes the cigar lighter downward via the knob 50, thereby igniting the cigar lighter automatically.

Also on the upper wall of the retainer 4, a lamp case 51, in which a lamp (not shown) capable of lighting the inside of the inner case 2 will be held, is fixed by spot welding while a lens 52 is held between the lamp case and the upper wall of the retainer. On the lower surface of the upper wall of the retainer 4, a guide member 53 for a protector (described later) is fixed by a rivet 54.

In the inner case 2, is mounted a protector 55 which is pivotably supported by a shaft 57. The end portions of the shaft 57 are inserted into holes 56a and 56b. The protector 55 is biased upwardly by a torsion spring 58 provided around the shaft 57. The inner case 2 is fixed to the outer case 1 by engagement between a projecting portion 59 formed on the rear edge of the inner case and a hole 60 opened on the rear wall of the outer case and by engagement between the bottom portion of the inner case and a plate spring 61 fixed on the inner bottom surface of the outer case. A hole 62 is the bottom wall of the outer case 1 is provided for taking the inner case 2 out of the outer case. By inserting fingers into the hole 62 from beneath and pushing the inner case 2 upward, the inner case can be easily taken out of the outer case.

In the above embodiment, the box means is drawn outwardly and moved inwardly as follows.

Figure 3:
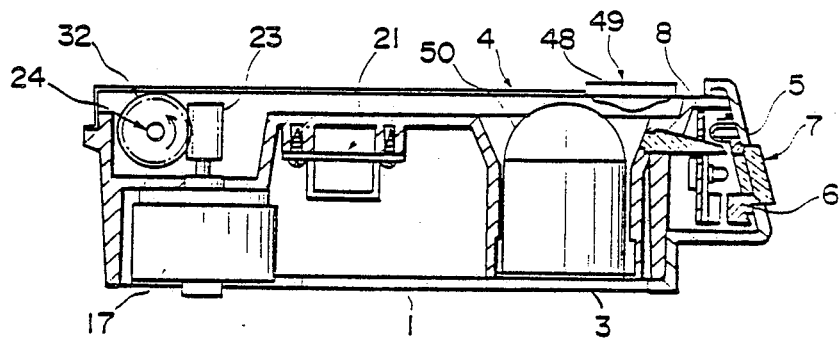
FIG. 3 is another sectional view of the device shown in FIG. 1.

FIG. 3 shows the state wherein the outer case 1 is located in the retainer 4 and the cigar lighter 3 is also being put in the retainer. When the push button 7 is pushed from this state, the switch 10 is activated ON, the circuit for the motor 17 is closed and the motor starts. The worm gear 23 fixed to the motor shaft rotates the helical gear 32. The driving force from the motor 17 is transmitted to the drive shaft 24 via the helical gear 32, the friction plate 31, the driven plate 30 and pin 29, and the drive shaft is rotated. The spur gears 25 and 26 fixed to the end portions of the drive shaft 24 are rotated, counterclockwise in FIG. 3. As the spur gears 25 and 26 engage with the racks 38 and 39 formed along the guide rails 36 and 37, the drive shaft 24 is moved forward by the rotation of the spur gears and the outer case 1 is also moved forward, that is, withdrawn from the retainer 4 in the right direction in FIG. 3.

When the withdrawing movement of the outer case 1 proceeds, the convex portion 48 of the cigar lighter pushing member 49 comes into contact with the knob of the cigar lighter 3, and then the cigar lighter is pushed downward and the cigar lighter is ignited automatically.

Figure 4:
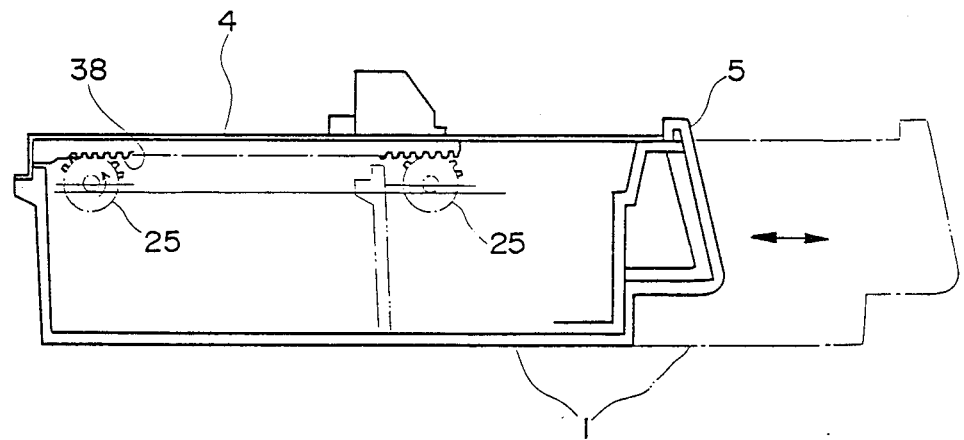
FIG. 4 is a schematic sectional view of the device shown in FIG. 1.

When the withdrawing movement of the outer case 1 proceeds further, the outer case reaches the end position shown with a chain dot line in FIG. 4. In this end position, the limit switch 21 contacts with the striker 43, the circuit for the motor 17 is opened by the operation of the limit switch, and the rotation of the motor and the motion of the outer case 1 are stopped. At this time, the overrun of the outer case 1 is prevented by the engagement of the stoppers 45 and 46.

When the push button 7 is pushed again in the above state, the switch 10 is activated ON again and the motor 17 rotates in the direction reverse to the above direction for retracting the outer case 1. Therefore, the outer case 1 is automatically returned into the retainer 4 via the engagement of the spur gears 25 and 26 and the racks 38 and 39. In the retracted position of the outer case 1, the position shown in FIG. 3, the limit switch 21 comes into contact with the striker 44, the circuit for the motor 17 is opened by the operation of the limit switch, and the rotation of the motor and the inward motion of the outer case are stopped. Overrun of the outer case 1 is prevented by the engagement of the door plate 5 with the front edge of the retainer 4.

Thus in this embodiment the inner case 2 and the cigar lighter 3 are integrally moved, and the automatic movement in both the extended and retracted directions is achieved by the motor 17 and the driving force transmission means. Since the motor 17 as a power source means is provided in the back of the location of the cigar lighter 3 in the outer case 1, the space which has been a dead space in the conventional device can be effectively utilized. Particularly, since the motor 17 is placed completely within the space which has been a dead space, the addition of the motor does not substantially enlarge the size of the entire ashtray device. Since the driving force transmission means is constructed as a compact mechanism including the worm gear 23, the helical gear 32, the drive shaft 24, the spur gears 25 and 26 and the racks 38 and 39, the capacity of the ash box formed by the inner case 2 is not significantly reduced by the means and a sufficient capacity can be ensured.

Figure 2:
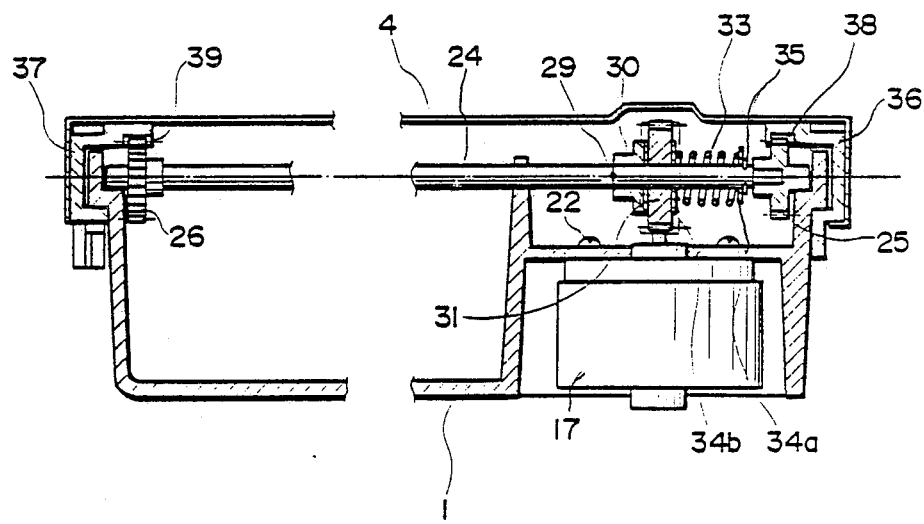
FIG. 2 is a sectional view of the device shown in FIG. 1.

Moreover in this embodiment, as the guide rails 36 and 37 and racks 38 and 39 are integrally formed, these members as a whole are constructed as a simple and compact structure in comparison with the structure wherein guide rails and racks are formed as separate members. Since the racks 38 and 39 are formed on the inner surfaces of upper walls, the relationship of the positions between the spur gears 25 and 26 and the racks 38 and 39 can be easily determined as illustrated in FIG. 2, and the backlash or the like in this portion can be easily prevented and smooth transmission of the driving force can be ensured, in comparison with the device wherein guide rails and racks are located at separate positions.

In the torque limiter mechanism 100, when a driving torque larger than the allowable torque predetermined by the spring 33 is applied, a slippage between the driven plate 30 and the friction plate 31 occurs, thereby preventing the transmission of an excessive torque. For example, when the outer case 1 can not be moved by the driving force of the motor 17 because of an excessive store of cigarette ends in the inner case 2, or when a shock force etc. acts in a reverse direction when the outer case 1 is moved in one direction by the motor 17, a slippage between the driven plate 30 and the friction plate 31 in the torque limiter mechanism 100 occurs, thereby preventing the motor or various portions in the driving force transmission means from receiving an excessive load. In the abnormal states as described in the above, by the operation of the torque limiter mechanism 100, the motor 17 races while the movement of the outer case 1 is stopped. However, the racing state of the motor 17 can be easily stopped by a timer which will be provided in the circuit. In case that the outer case 1 can not be moved on account of excessive store of cigarette ends in the inner case 2, the outer case can be manually moved while the operation of the motor is stopped. Even in this case, a slippage in the torque limiter mechanism 100 occurs so that an excessive load is prevented from acting toward the motor 17.

The operation of the motor 17 is controlled by operating the push button 7. Since the push button 7 consisting of a lens is illuminated from the inside of the outer case 1 by the light of the lamp 11, the push button can be recognized easily even at night and the operating of the button can be ensured.

In this embodiment, since one lamp 11 can light both the push button 7 and the cigar lighter 3, the structure in this portion can be simplified and the number of parts can be decreased. Moreover, the space between the body of the outer case 1 and the door plate 5 which has been a dead space is effectively utilized as a space for the location of the printed board 8 equipped with the lamp 11 and the switch 10.

Figure 6:
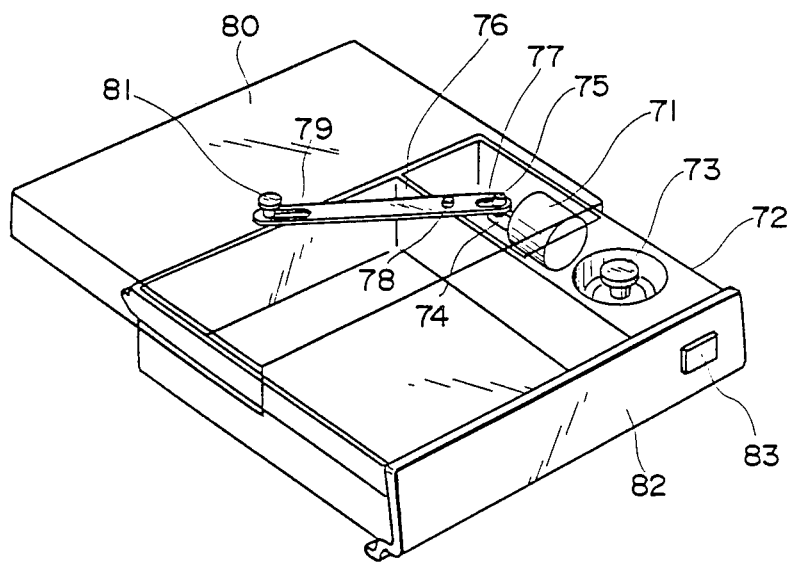
FIG. 6 is a perspective view of a container device according to a second embodiment of the present invention.

Next, FIG. 6 illustrates an ashtray device according to a second embodiment of the present invention.

In this embodiment, a diaphragm actuator 71 is used as power source means. The actuator 71 is provided in back of the location of a cigar lighter 73 in an outer case 72, similar to the first embodiment. A pin 75 is fixed to a rod 74 of the actuator 71 and the pin slidably engages with a slot 77 of a link plate 76. The link plate 76 is pivotably supported around a pin 78 on the outer case 72. On the other end portion also is provided a slot 79, and the slot engages with a pin 81 fixed to a retainer 80. The diaphragm actuator 71 is operated by, for example, utilizing the negative pressure of intake air of an engine mounted on a vehicle (negative pressure stored in a vacuum tank etc.). As the actuator 71, a single acting type actuator for use of automatic extending action of the outer case 72 may be adopted, or a double acting type actuator for use of automatic extending and retracting actions of the outer case may be adopted. The on-off operation of the actuator 71 is controlled by a switching knob 83 provided on a front door plate 82 of the outer case 72. Thus a stroke type actuator can be used as a power source means in the present invention. By disposing the actuator 71 in back of the location of the cigar lighter 73, the space which has been a dead space in conventional device can be effectively utilized substantially without enlarging the size of the entire device and reducing the capacity of ash box.

Figure 7:
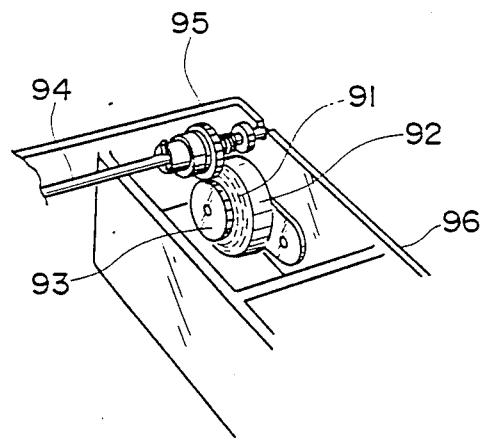
FIG. 7 is a partially perspective view of a container device according to a third embodiment of the present invention.
Figure 8:
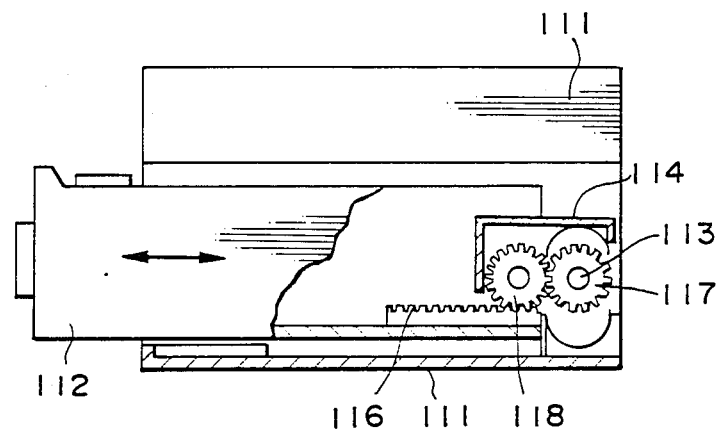
FIG. 8 is a partly cut away schematic sectional view of a container device according to a fourth embodiment of the present invention.
Figure 9:
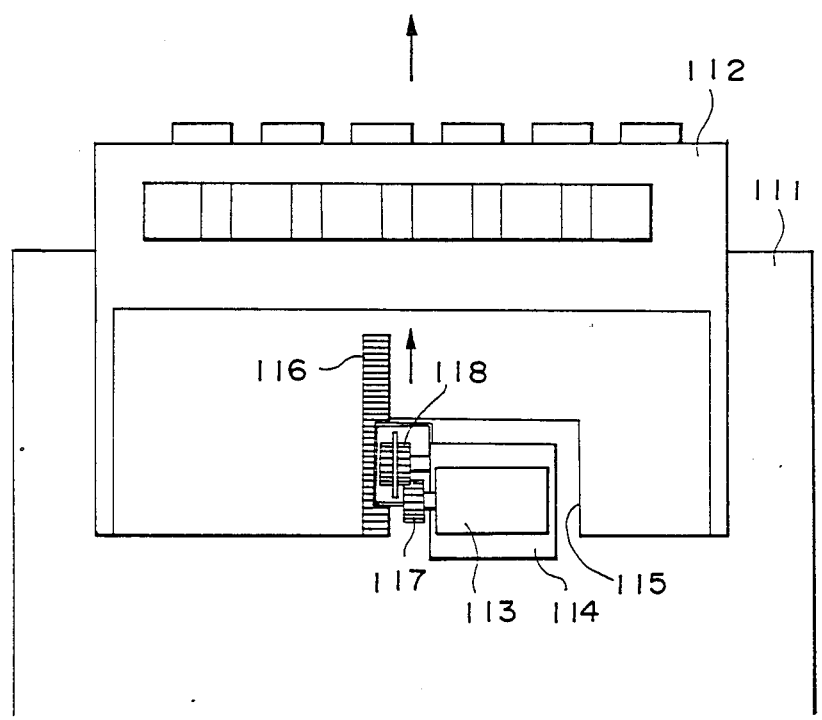
FIG. 9 is a schematic plan view of the device shown in FIG. 8.
Figure 10:
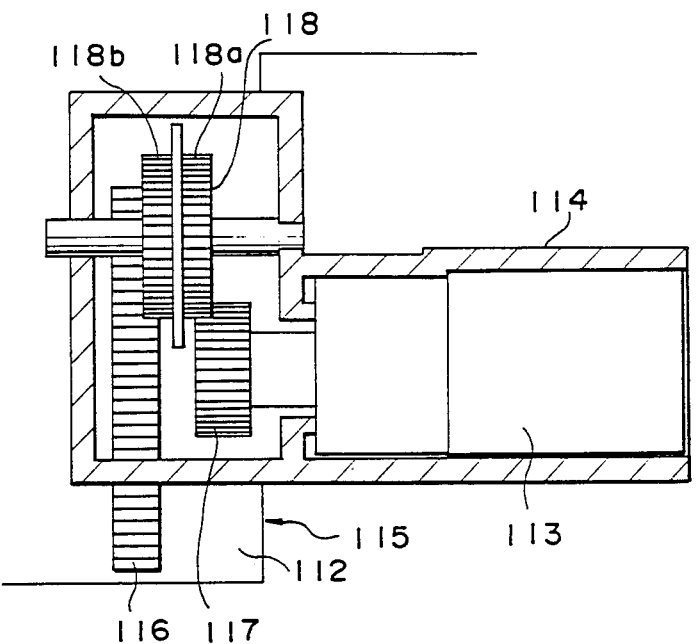
FIG. 10 is an enlarged partial horizontal sectional view of the device shown in FIG. 8.
Figure 11:
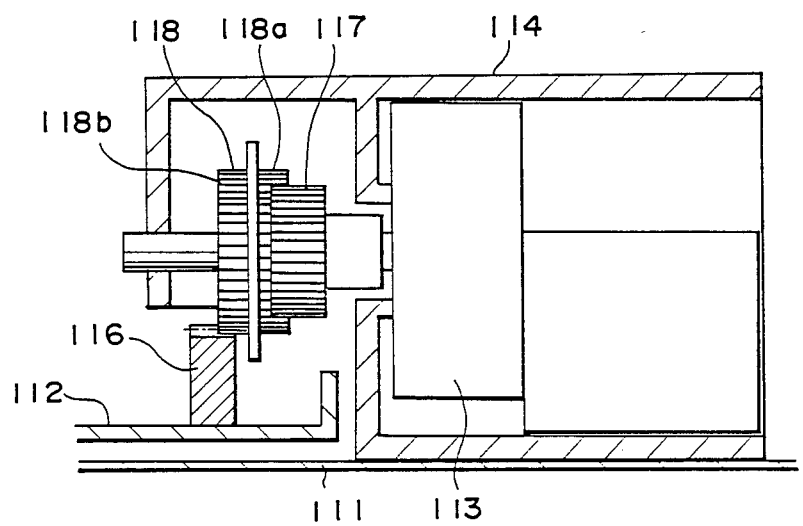
FIG. 11 is a vertical sectional view of the device shown in FIG. 10.
Figure 12:
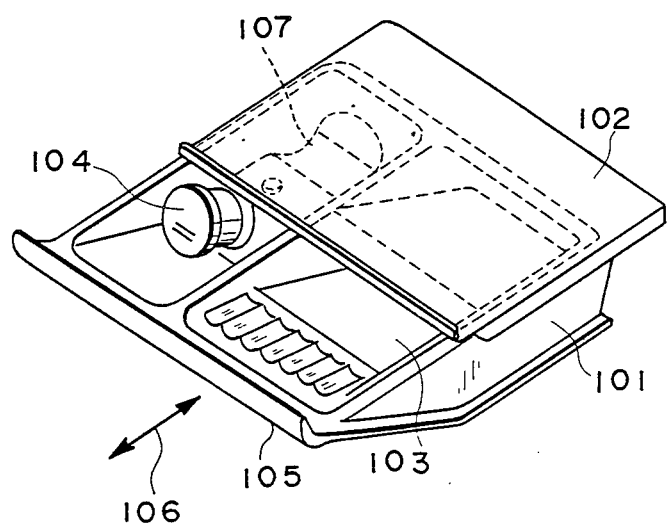
FIG. 12 is a perspective view of a conventional ashtray device.

Next, FIG. 7 illustrates a part of an ashtray device according to a third embodiment of the present invention.

In this embodiment, a spiral spring built-in type actuator 92 having a spiral spring 91 is used as a power source means. A gear 93 is fixed to the output shaft of the actuator 92. The gear 93 engages with a gear 95 provided around a drive shaft 94. A driving force transmission mechanism similar to in the first embodiment may be adopted for the mechanism downstream of the gear 95. With the actuator 92 a damper (not shown) may be combined in order to obtain a smooth operation of the actuator.

In this embodiment, since the actuator 92 is a single acting type actuator, the driving force of the actuator is utilized for the automatic movement of an outer case 96 in one of the extending direction or retracting direction. When it is utilized for the movement in the extending direction, the movement of the outer case 96 in the retracting direction is achieved by manual operation and the spiral spring 91 is wound by a manual operation. As the automatic movement is not due to an electrical driving force, a stopping mechanism is required for the device in order to stop the withdrawn outer case 96 at an adequate position.

Although each power source means is provided on an outer case in the above three embodiments, power source means may be disposed on a retainer or retainer side. For instance, in accordance with the device shown in FIG. 1, the portion in back of the location of the cigar lighter in the outer case may be cut away, power source means may be provided on the retainer at the position corresponding to the above cut away portion of the outer case, and driving force transmission means may be provided between the power source means on the retainer and the outer case.

Moreover, although an inner case and a cigar lighter are provided in one outer case in each of the above three embodiments, an ash box and a cigar lighter case holding a cigar lighter may be formed as separate cases which can be held in the same retainer, and the separate cases may be integrally moved by interlocking.

Next, FIGS. 8–11 show a container device according to a fourth embodiment of the present invention.

In this embodiment, the box means according to the present invention is a control box for the operation of an air conditioner for a vehicle. In this regard, the present invention can be applied to any other container device used for a vehicle and having box means, without being restricted to an ashtray device.

In FIGS. 8-11, a housing 111 and a retainer are provided according to the present invention. The housing 111 is assembled to a panel etc. In the housing 111 a control box 112 is slidably and drawably held as box means of the present invention. The control box 112 has various push buttons etc. for operation of the air conditioner. This control box 112 is extended from the housing 111 in the direction shown with an arrow in FIG. 9 when the operation of the air conditioner is required, and it is retracted into the housing when the operation is not required. As a power source means for driving the control box 112, a geared motor 113 is used in this embodiment. The motor 113 is fixed in a motor box 114 mounted on the hosing 111. The control box 112 is cut away at the back portion, and the motor 113 and the motor box 114 are disposed at the position on the housing 111 corresponding to this cut away portion 115. A gear 117 is fixed to the output shaft of the motor 113, and the driving force of the motor is transmitted to a rack fixed to the control box 112 via the gear 117 and a torque limiter 118. The torque limiter 118 has teeth 118a engaging with the gear 117 and teeth 118b engaging with the rack 116 and it can slip between both teeth portions 118a and 118b when an excessive torque is applied therebetween.

In this embodiment, the driving force of the motor 113 is transmitted to the rack 116 via the gear 117 and the torque limiter 118, and the control box 112 is moved integrally with the rack. Since the motor 113 is disposed in back of the location of the control box 112, the motor or the driving force transmission means can be prevented from projecting laterally or vertically from the control box, and the device becomes compact as a whole.

The torque limiter 118 can transmit a torque lower than a predetermined set torque, but when the torque becomes higher than the set torque, the torque limiter slips and does not transmit the torque. Therefore, for example, when a problem occurs with the sliding movement of the control box 112 because of the clogging of foreign materials etc., overloading of the motor 113 or the transmission means will be naturally prevented by the slippage in the torque limiter 118. Also, even when the control box 112 is stopped in the middle of a predetermined stroke on account of a stopping of the movement of the box, the box can be easily moved to the end of stroke by hand because of the slippage of the torque limiter 118. In this manual movement of the control box 112, elimination of foreign materials which have been interfering with sliding portions of the device will be possible.

Although only several preferred embodiments of the present invention have been described in detail, it will be appreciated by those skilled in the art that various modifications and alterations can be made to the particular embodiments shown without materially departing from the novel teachings and advantages of this invention. Accordingly, it is to be understood that all such modifications and alterations are included within the scope of the invention as defined by the following claims.

What is claimed is:

1. A container device used in a vehicle comprising:
a retainer;
box means extendably held by said retainer;
power source means capable of driving said box means at least in one of the directions of extending said box means from said retainer and retracting said box means into said retainer, said power source means bring provided on a back portion of said box means itself and a back portion of said retainer as viewed along the direction of extending and retracting of said box means; said power source means is connected to said box means, a rack is operatively provided on said retainer and
driving force transmission means between said power source means and said rack for transmitting the driving force of said power source means from said power source means to said box means.

2. The device of claim 1, wherein said power source means is a motor.

3. The device of claim 1, wherein said power source means is a spiral spring built-in type actuator.

4. The device of claim 3, wherein said spiral spring built-in type actuator has a damper.

5. The device of claim 1, wherein said container device used in a vehicle is an ashtray device.

6. The device of claim 5, wherein said box means comprises means which can extend and retract an ash box and a lighter simultaneously, and said power source means is provided on a back position of the location of said lighter as viewed along the direction of extending and retracting of said box means.

7. The device of claim 1, wherein a torque limiter mechanism is provided in said driving force transmission means.

8. The device of claim 1, wherein said container device used in a vehicle further comprises switch means which can control the operation of said power source means.

9. The device of claim 10, wherein said container device used in a vehicle further comprises lighting means for said switch means.

10. The device of claim 1, wherein said box means is a control box for the operation of an air conditioner.

* * * * *